UNITED STATES PATENT OFFICE.

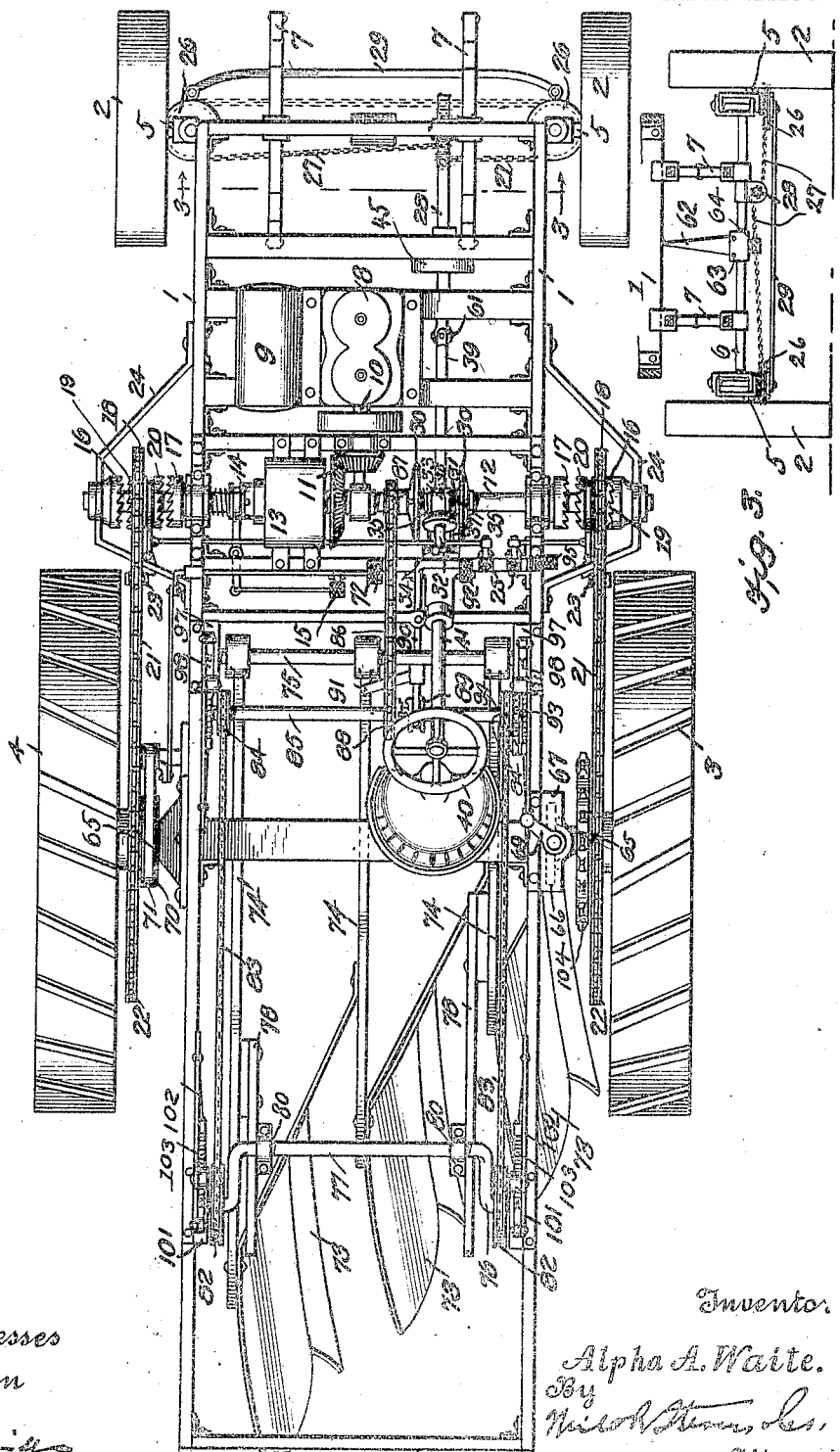

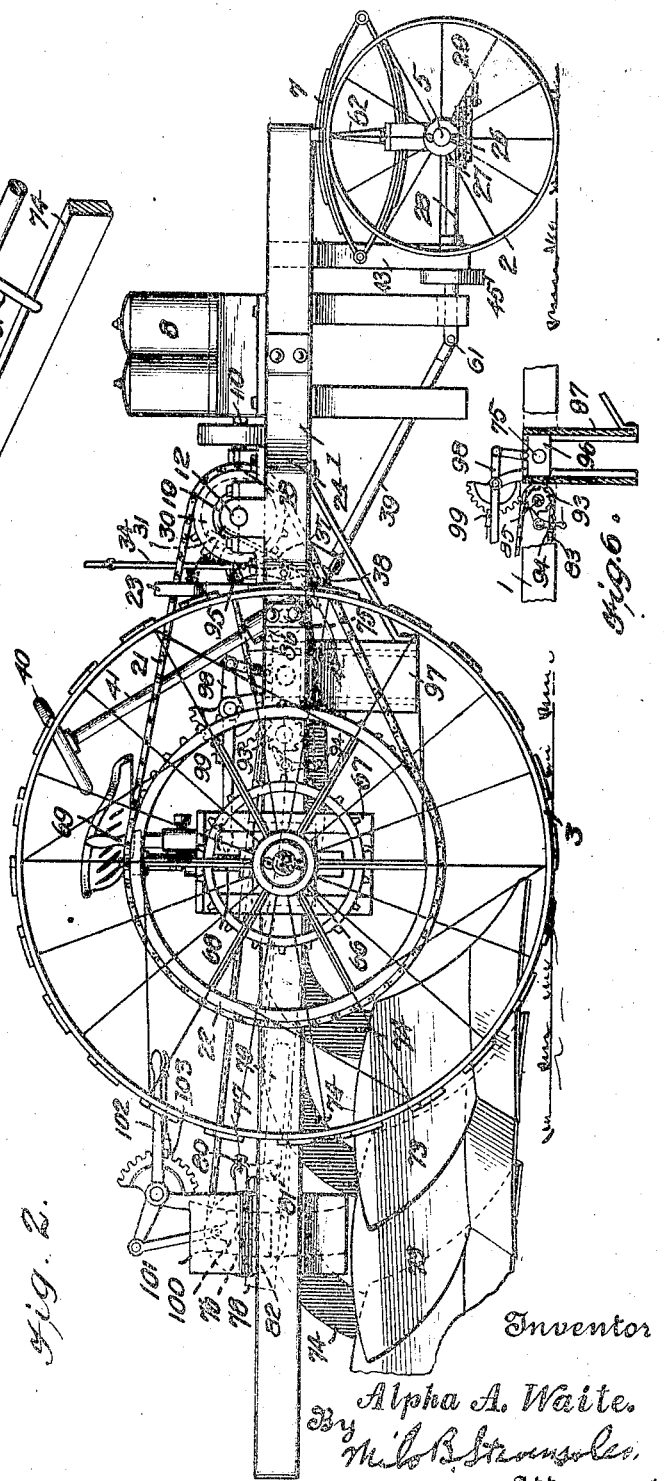
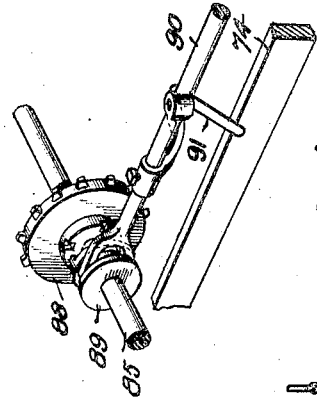
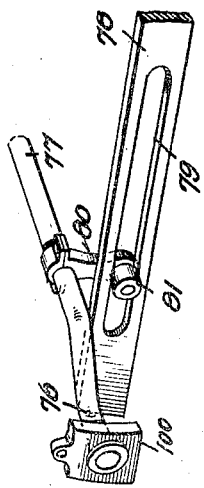
A. A. WAITE.
MOTOR PLOW.
APPLICATION FILED JAN. 23, 1912.
1,047,344.
Patented Dec. 17, 1912.
2 SHEETS—SHEET 2.
Witnesses
E. Larson
Inventor
Alpha A. Waite.
Attorneys

ALPHA A. WAITE, OF LA HARPE, KANSAS.

MOTOR-PLOW.

1,047,344.  Specification of Letters Patent.  Patented Dec. 17, 1912.

Application filed January 23, 1912. Serial No. 672,806.

*To all whom it may concern:*

Be it known that I, ALPHA A. WAITE, a citizen of the United States, residing at La Harpe, in the county of Allen and State of Kansas, have invented certain new and useful Improvements in Motor-Plows, of which the following is a specification.

This invention relates to that class of plows which are self-propelled, a plow carriage being provided which is driven by a motor, preferably an internal combustion engine; and it is the object of the invention to provide a plow of this kind embodying certain novel features of construction to be hereinafter described and claimed.

A further object of the invention is to provide an improved support for the plow-shares whereby the same may be readily raised and lowered.

In order that the invention may be better understood, reference is had to the accompanying drawings forming a part of this specification, in which drawings—

Figure 1 is a plan view of the machine; Fig. 2 is a side elevation thereof; Fig. 3 is a transverse section on the line 3—3 of Fig. 1; Fig. 4 is a detail in perspective showing the plow lift; Fig. 5 is a detail in perspective showing the automatic clutch mechanism; Fig. 6 is a sectional detail of the elevating mechanism of the front support of the plow beams.

Referring specifically to the drawings, 1 denotes the side bars of the chassis of a plow carriage having steering wheels 2 at the front, and traction wheels 3 and 4, respectively, at the rear, the wheel 3 being on the furrow side, and the wheel 4 on the land side. The steering wheels are carried by stub axles 5 which are pivotally connected to the front axle 6, and between the latter and the chassis are interposed elliptic springs 7.

On the chassis, near its front end, is mounted a motor 8 which may be an ordinary internal-combustion engine obtaining its fuel supply from a tank 9. The crank shaft 10 of the engine is connected by bevel gears 11 to a driving shaft 12 extending transversely of the carriage and mounted in suitable bearings carried by the side bars 1. A suitable transmission gearing is provided, the same being inclosed in a case 13. A clutch 14 is also provided, the same being operated by a foot pedal 15.

On each end of the driving shaft 12 are mounted two ratchet clutch-members 16 and 17, respectively, between which members is slidably mounted a sprocket wheel 18 having ratchet clutch-teeth 19 and 20, respectively, on opposite sides. The sprocket wheel 18 on one side of the machine is connected by a sprocket chain 21 to a sprocket wheel 22 connected to the traction wheel on the corresponding side of the machine, and the sprocket wheel 18 on the other side of the machine is geared in like manner to the traction wheel on that side of the machine.

The sprocket wheels 18 are adjustable so as to bring their clutch-teeth 19 into locking engagement with the teeth of the clutch-members 16, and their clutch-teeth 20 into engagement with the clutch-members 17. The sprocket wheels are loose on the shaft so that no motion is transmitted when they are disconnected from the clutch-members. The clutch-members 16 are designed to drive the sprocket wheels forwardly when the shaft is turning in that direction, and the clutch-members 17 drive the sprocket wheels in a reverse direction when the shaft is reversed. Suitable guides 23 for the chains 21 are provided. The extremities of the driving shaft 12 are supported in brackets 24 carried by the side bars 1.

By the herein described driving means, the machine can be run forward or backward, and as the driving means of the two traction wheels are independent, either one of said wheels may be thrown out of gear when making turns. Foot pedals 25 are provided for shifting the sprocket wheels 18.

The stub axles 5 carry disks 26 having grooved peripheries to receive a steering chain 27. The chain passes around the disks, and extends inwardly to a shaft 28 on which it is wound in such a manner that when the shaft is rotated, the stub axles are swung on their pivots, thereby shifting the front wheels 2 to steer the machine. The disks 26 are also connected by a cross rod 29.

A hand, as well as a power, steering gear is provided. This mechanism comprises the following instrumentalities: Connected to the driving shaft 12, so as to rotate therewith, are two friction disks 30 between which is located a friction wheel 31 which latter is adjustable so that it may be placed in contact with either one of said disks according to the direction it is desired to steer the machine. The friction wheel is mounted on a shaft 32 supported at one end in a bearing sleeve 33 which loosely encircles the shaft 12 between the disks 30. The other end of the shaft is supported by a hand lever 34 which, when swung to one side or the other, shifts the shaft 32, and places the wheel in engagement with one or the other of the friction disks. The friction wheel is normally disengaged from both disks, it being held in this position by springs 35 interposed between said disks and the sleeve 33. On the shaft 32 is made fast a sprocket wheel 36 which is connected by a chain 37 to a sprocket wheel 38 on a shaft 39 connected to the winding shaft 28 by a mechanism which is the subject matter of a companion application, No. 622,966, filed April 21, 1911. The manual steering device is a hand wheel 40 carried by a shaft 41 which is geared to the shaft 39 by bevel gears 42.

If it is desired to steer the machine by power, it is necessary only to place the wheel 31 in engagement with one or the other of the friction disks 30, according to the direction the machine is to take, whereupon the motion of the shaft 12 is transmitted to the shaft 39, and the latter, by reason of its connection with the shaft 28, rotates the latter and through the chain 27 shifts the steering wheels as already described. The same action takes place when the shaft 39 is operated by hand from the steering wheel 40.

When the machine is being driven over rough roads, it is desirable to protect the motor 8 from being jarred, for which purpose the springs 7 are provided. However, when the machine is at work in the field, the motor does not need this protection, and it is also desirable to hold the frame steady, as otherwise it would rack the plowshares. In order to prevent action of the springs 7 for the purpose stated, there is located on the axle 6, midway between its ends, an upstanding stud 62 which extends beneath and into contact with the front portion of the chassis, and prevents the same from springing up and down when the machine is in operation. At all other times the stud will be removed, it being fastened to the axle by a clamp 63 held in place by a set screw 64.

The traction wheel 3, as already stated, is on the furrow side, and it is adjustable vertically in order that the machine may be leveled. This vertical adjustment is effected by mounting the axle 65 of said wheel in a block 66 which block is slidable up and down in a frame 67 carried by the side bar 1 of the chassis. Through the top of the frame is threaded a screw 68 which is connected to the block 66, and when operated adjusts the same vertically to effect the herein described adjustment of the wheel 3. The screw is provided with a crank handle 69 to facilitate its operation.

On the axle of the traction wheel 4 is a brake drum 70 engageable by a band brake 71 which is operated by a foot pedal 72.

The plowshares are indicated at 73, they being carried by beams 74 which latter are pivotally connected at their front ends on a transverse horizontal shaft 75 so that they may be swung in a vertical plane to raise and lower the plowshares. Above the rear ends of the plow beams is located a transverse horizontal shaft 76 having a crank bend 77. The two outside plow beams carry longitudinally slotted bars 78, the slots of said bars being indicated at 79. On the crank bends 77 are mounted depending arms 80 which carry rollers 81, these rollers working in the slots 79. On the shaft 76 are sprocket wheels 82 which are connected by chains 83 to sprocket wheels 84 on a shaft 85 extending parallel to the driving shaft 12, and geared thereto by a chain 86 passing over a sprocket wheel 87 on the shaft 12, and a sprocket wheel 88 on the shaft 85. The sprocket wheel 88 is loose on the shaft 85 and a clutch 89 is provided for locking said sprocket wheel to the shaft. When the sprocket wheel 88 is clutched to the shaft 85, the chains 83 transmit the motion of said shaft to the shaft 76. Rotary movement of the shaft 76 swings the crank bend 77 thereof vertically, and through the connection between the same and the bar 78 swings the plow beams 74 up or down according to the direction in which the shaft 76 is rotated, thus raising or lowering the plowshares 73.

Means are provided for automatically unlocking the shaft 85 when the plowshares have been lifted out of the ground. To effect this automatic unclutching of the shaft, a shifter lever 90 is connected to the clutch 89. On this lever is adjustably mounted an arm 91 extending obliquely therefrom into the path of the front end of the middle plow beam 74, said arm being so shaped that when the said plow beam comes in contact therewith as it is elevated, it swings the lever 90 in a direction to disengage the clutch 89. The lever 90 also has a foot pedal 92 for actuating the same to engage the clutch. The shaft 85 is also provided with a lock to prevent the plowshares from dropping down after they have been elevated. This lock comprises a ratchet disk 93 made fast to one end of the shaft, and engaged by a pivoted pawl 94 connected to a foot pedal 95.

The shaft 75 is supported in vertically adjustable bearings, said bearings comprising blocks 96 which are slidable up and down in a frame 97 carried by the side bars 1. Hand levers 98, provided with suitable locking devices 99, are connected to the respective blocks 96 for the purpose of raising and lowering the same in the frames 97.

The bearings of the shaft 76 are also vertically adjustable, said bearings being blocks 100 which are mounted to slide up and down in frames 101 carried by the side bars 1. Hand levers 102 are connected to the bearing blocks, whereby the latter are adjusted up and down in the frames 100, said levers being provided with suitable locking devices 103.

The purpose of the herein described vertical adjustment of the shafts 75 and 76 is to set the plowshares at the desired depth. The plowshares are raised out of the ground by operating the shaft 76 as already described.

On the axle of the traction wheel 3 is also made fast a sprocket wheel 104 which is adapted to be geared to a pulverizer or harrow to drive the same.

I claim:

1. A plow comprising a carriage, pivoted plow beams mounted thereon, vertically adjustable bearings mounted on the carriage, a shaft supported in said bearings, said shaft having an operative connection with the rear ends of the plow beams, and means for rotating the shaft to elevate and lower the plow beams.

2. A plow comprising a carriage, pivoted plow beams mounted on the carriage, longitudinally slotted bars extending from the plow beams, vertically adjustable bearings mounted on the carriage, a transverse shaft supported in said bearings, said shaft having a crank portion, arms carried by said crank portion and engageable with the slots of the aforesaid bars, and means for rotating the aforesaid shaft.

In testimony whereof I affix my signature in presence of two witnesses.

ALPHA A. WAITE.

Witnesses:
 L. P. EDWARDS,
 LOIS WILSON.